United States Patent
Lee et al.

(10) Patent No.: US 9,604,114 B2
(45) Date of Patent: Mar. 28, 2017

(54) SCREEN BASEBALL GAME APPARATUS WITHOUT TEMPORAL AND SPATIAL LIMITATIONS

(71) Applicant: Realyagu Zone Co., Ltd., Seoul (KR)

(72) Inventors: Seung-Jin Lee, Seoul (KR); Han-Jo Kwon, Seoul (KR); Hyoung-Gon Kim, Seoul (KR)

(73) Assignee: REALYAGU ZONE CO., LTD., Seoul (KR)

( * ) Notice: Subject to any disclaimer, the term of this patent is extended or adjusted under 35 U.S.C. 154(b) by 0 days.

(21) Appl. No.: 15/157,994

(22) Filed: May 18, 2016

(65) Prior Publication Data

US 2016/0339316 A1 Nov. 24, 2016

(30) Foreign Application Priority Data

May 19, 2015 (KR) ........................ 10-2015-0069982

(51) Int. Cl.
*A63B 69/00* (2006.01)
*A63B 69/40* (2006.01)
(Continued)

(52) U.S. Cl.
CPC ........ *A63B 69/0002* (2013.01); *A63B 69/406* (2013.01); *A63F 13/25* (2014.09); *A63F 13/812* (2014.09); *A63B 2069/0008* (2013.01)

(58) Field of Classification Search
CPC ....... A63B 69/00; A63B 69/406; A63F 13/25; A63F 13/812
(Continued)

(56) References Cited

U.S. PATENT DOCUMENTS

| | | | | |
|---|---|---|---|---|
| 5,195,744 A | * | 3/1993 | Kapp | ................... A63B 69/406 473/451 |
| 6,672,298 B2 | * | 1/2004 | Battersby | ........... A63B 69/0002 124/78 |

(Continued)

FOREIGN PATENT DOCUMENTS

| | | |
|---|---|---|
| JP | 2005-204947 A1 | 8/2005 |
| JP | 2005204947 A1 | 8/2005 |

(Continued)

*Primary Examiner* — Gene Kim
*Assistant Examiner* — M Chambers
(74) *Attorney, Agent, or Firm* — Heslin Rothenberg Farley & Mesiti P.C.; George Blasiak

(57) ABSTRACT

A screen baseball game apparatus without temporal and spatial limitations includes a pitching machine unit pitching a ball according to a pitch type selected by a defense, a batting detection unit detecting batting of a batter, a game management unit registering a user personal bank, periodically checking screen baseball devices, performing a simulation along the trajectory of a batted ball converted from received batting detection data, and outputting simulation information, a game photographing unit photographing batting of a batter, a screen displaying pitching, the simulation information, and the batting image, a screen driving unit receiving the batting image and the simulation information and reproducing them on the screen, a game server matching stores having available screen game devices, a database storing the periodic check data, an available game schedule, the batting image, and game information, and a device control unit receiving the control instruction for integral monitoring and controlling.

14 Claims, 17 Drawing Sheets

(51) Int. Cl.
*A63F 13/25* (2014.01)
*A63F 13/812* (2014.01)

(58) Field of Classification Search
USPC .................................................. 473/450–452
See application file for complete search history.

(56) References Cited

U.S. PATENT DOCUMENTS

| | | | | |
|---|---|---|---|---|
| 7,691,012 | B2* | 4/2010 | Cucjen | A63B 69/406 |
| | | | | 124/78 |
| 8,133,137 | B2* | 3/2012 | Grant | A63B 69/406 |
| | | | | 124/6 |
| 8,944,939 | B2* | 2/2015 | Clark | G01P 13/00 |
| | | | | 463/36 |
| 2015/0079565 | A1* | 3/2015 | Miller | G09B 23/281 |
| | | | | 434/252 |
| 2015/0238835 | A1* | 8/2015 | Ripken, Jr. | A63B 69/0002 |
| | | | | 473/451 |
| 2016/0279496 | A1* | 9/2016 | Lee | A63B 69/0002 |
| 2016/0279526 | A1* | 9/2016 | Lee | A63F 13/812 |
| 2016/0339316 | A1* | 11/2016 | Lee | A63B 69/0002 |

FOREIGN PATENT DOCUMENTS

| | | | |
|---|---|---|---|
| KR | 10-2001-0008367 | A1 | 2/2001 |
| KR | 1020010008367 | A1 | 2/2001 |
| KR | 10-2001-0026429 | A1 | 4/2001 |
| KR | 1020010026429 | A1 | 4/2001 |
| KR | 10-2010-0130279 | A1 | 12/2010 |
| KR | 1020100130279 | A1 | 12/2010 |
| KR | 10-2013-0025278 | A1 | 3/2013 |
| KR | 1020130025278 | A1 | 3/2013 |

* cited by examiner

140

SCREEN BASEBALL GAME APPARATUS WITHOUT TEMPORAL AND SPATIAL LIMITATIONS

CROSS-REFERENCE TO RELATED APPLICATION

This application claims priority to Korean Patent Application No. 10-2015-0069982 filed on May 19, 2015, and all the benefits accruing therefrom under 35 U.S.C. §119, the contents of which is incorporated by reference in its entirety.

BACKGROUND OF THE INVENTION

1. Field of the Invention

The present invention relates to a screen baseball game apparatus without temporal and spatial limitations, and more particularly to a screen baseball game apparatus without temporal and spatial limitations, enabling users to variously enjoy baseball without a difference in level between the users and temporal and spatial limitations, capable of actually moving a ball along a predetermined trajectory according to pitching or batting in a virtual baseball field, enabling a game server to receive periodical state check data and live game simulation data of screen baseball devices and to control the screen baseball devices so that the screen baseball devices perform operations intended by a manger in real time, and capable of improving game capability of a user by utilizing game information for a user training program.

2. Description of the Related Art

In general, a baseball is a game that a pitcher casts a ball, a catcher receives the ball, and a batter hits the ball to score a point.

In the batting practice of a batter, if one person casts a ball, the batter may bat the ball. In addition, the batter may carry out the batting practice by batting a ball fling and coming using a baseball batting practice device to periodically shoot a baseball.

Further, if a user is a beginner, a woman, or a child, the user may bat a tee-ball fixed to a support positioned at a predetermined height by a bat.

As described above, since baseball requires some persons and a relatively large space, an ordinary person has limitations of human power, time, and a space in freely interesting the baseball.

In order to solve the problem, conventionally, batting cages have been provided with pitching machine. In the case of the batting cages, it is actually impossible for a user to select a pitch type or cope with various conditions.

Further, since a game depending on batting progresses, reality and interesting are remarkably degraded in "strike", "out", or "scoring".

Meanwhile, recently, indoor golf driving ranges or screen golf driving ranges having maximized spatial utilization have been increased to allow a user to play golf as one of indoor sports using a ball.

In the case of a typical screen golf system, a predetermined projection apparatus projects images on the front surface of a screen and reproduces the images, and a hitter fixedly places a golf ball to a predetermined position and hits the golf ball into a virtual space projected onto the screen to progress a game.

However, in the case of golf, since only a hitter is required, and a ball to be hit is stopped, a game may progress or an image may be realized without a serious problem. On the other hand, in the case of baseball, a virtual ballpark must be formed, a pitcher and a batter are basically required, and a ball must be actually moved along a predetermined trajectory according to pitching and batting. Accordingly, there is a limitation when the screen golf system is applied to baseball.

Further, in the case of baseball, factors to determine "strike" or "ball" are required, various offensive and defensive actions are optionally and dynamically made and a score is dynamically calculated. Accordingly, the baseball basically differs from the golf in game factors, so that the application of the screen golf system to the baseball is actually impossible.

As related arts, there are patent document 1 (KR10-2010-0130279 A1) and patent document 2 (JP2005-204947 A1).

SUMMARY OF THE INVENTION

An object of the present invention is to provide a screen baseball game apparatus without temporal and spatial limitations, enabling ordinary people to easily select a pitch type of a ball to be pitched or various game conditions, capable of variously adjusting determination of "strike" or "ball", options in various offensive and defensive actions, or a point calculating scheme beyond a game depending on batting, and enabling users to share the information of players and a game simulation in real time online between regions geographically spaced apart from each other.

Another object of the present invention is to provide a screen baseball game apparatus without temporal and spatial limitations, enabling a game server to receive periodic state check data and live game simulation data of screen baseball devices installed in a plurality of store systems, to transmit required instructions or data so that operations intended by a manger can be performed in real time, and to store batting images during a game so that the batting images can be utilized for a user training program and a character development program.

The objects of the present invention are not limited to the above-mentioned objects, and other objects will be clearly understood from the following description by those skilled in the art.

In order to accomplish the above objects, there is provided a screen baseball game apparatus without temporal and spatial limitations. The screen baseball game apparatus includes a pitching machine unit that pitches a ball according to a pitch type based on pitching information selected by a defense side, a batting detection unit that, as the pitching is started when a batter in an offense side presses a pitching pedal, detects batting of the batter and outputs batting detection data, a game management unit that registers a personal bank of a user, periodically checks states of screen baseball devices and whether the screen baseball devices operate normally, receives the batting detection data, converts the batting detection data into a trajectory of a batted ball, performs a simulation along the trajectory of the batted ball, and outputs simulation information, a game photographing unit that photographs batting of the batter and transmits a batting image to the game management unit, a screen that displays a pitching motion, the simulation information, and the batting image, a screen driving unit that receives the batting image and the simulation information and reproduces the batting image and the simulation information on the screen, a game server that matches stores, which have available game devices among a plurality of stores, with each other, checks states of the screen baseball devices provided in the plurality of stores, and transmits and receives information selected by the user and a control instruction of a manger through the game management unit, a database that stores periodic check data of the game management unit, stores an available game schedule input through the game management unit in each store to provide the available game schedule to the game server, and stores the batting image and game information data to be utilized for a user training program and a character development program, and a device control unit that receives the control instruction from the game server to collectively monitor and control the screen baseball devices such that the screen baseball devices process the control instruction.

Details of other embodiments are included in the detailed description and accompanying drawings.

The advantages, the features, and schemes of achieving the advantages and features of the present invention will be apparently comprehended by those skilled in the art based on the embodiments, which are detailed later in detail, together with accompanying drawings. The present invention is not limited to the following embodiments but includes various applications and modifications. The embodiments will make the disclosure of the present invention complete, and allow those skilled in the art to completely comprehend the scope of the present invention. The present invention is only defined within the scope of accompanying claims.

As described above, according to the present invention, ordinary people can easily select a pitch type of a ball to be pitched or various game conditions to freely enjoy baseball without a limitation such as the difference in level between users.

Further, determination of "strike" or "ball", options in various offensive and defensive actions, or a point calculating scheme can be variously adjusted beyond a game depending on batting. In addition, a ball is actually movable along a predetermined trajectory according to pitching or batting in a virtual baseball field, so that the reality and interesting can be improved.

In addition, users can play a game even in mutually different regions by sharing the information of players and a game simulation in real time online between regions geographically spaced apart from each other. Accordingly, the users can variously enjoy baseball without temporal and spatial limitations. The batting posture of the user is corrected through the character development program based on the batting images in the game, so that the user can improve a game capability.

In addition, the game server located in a remote place can monitor the screen baseball devices installed in a plurality of store systems to perform management including state check, function adjustment, and maintenance of the screen baseball devices.

DETAILED DESCRIPTION OF THE INVENTION

Hereinafter, an exemplary embodiment of the present invention will be described in detail with reference to accompanying drawings.

In the following description, a portable terminal refers to a smart phone, a personal digital assistant (PDA), a portable multimedia player, or a smart pad which can be aided by a computer through Internet communication.

Figure 1:
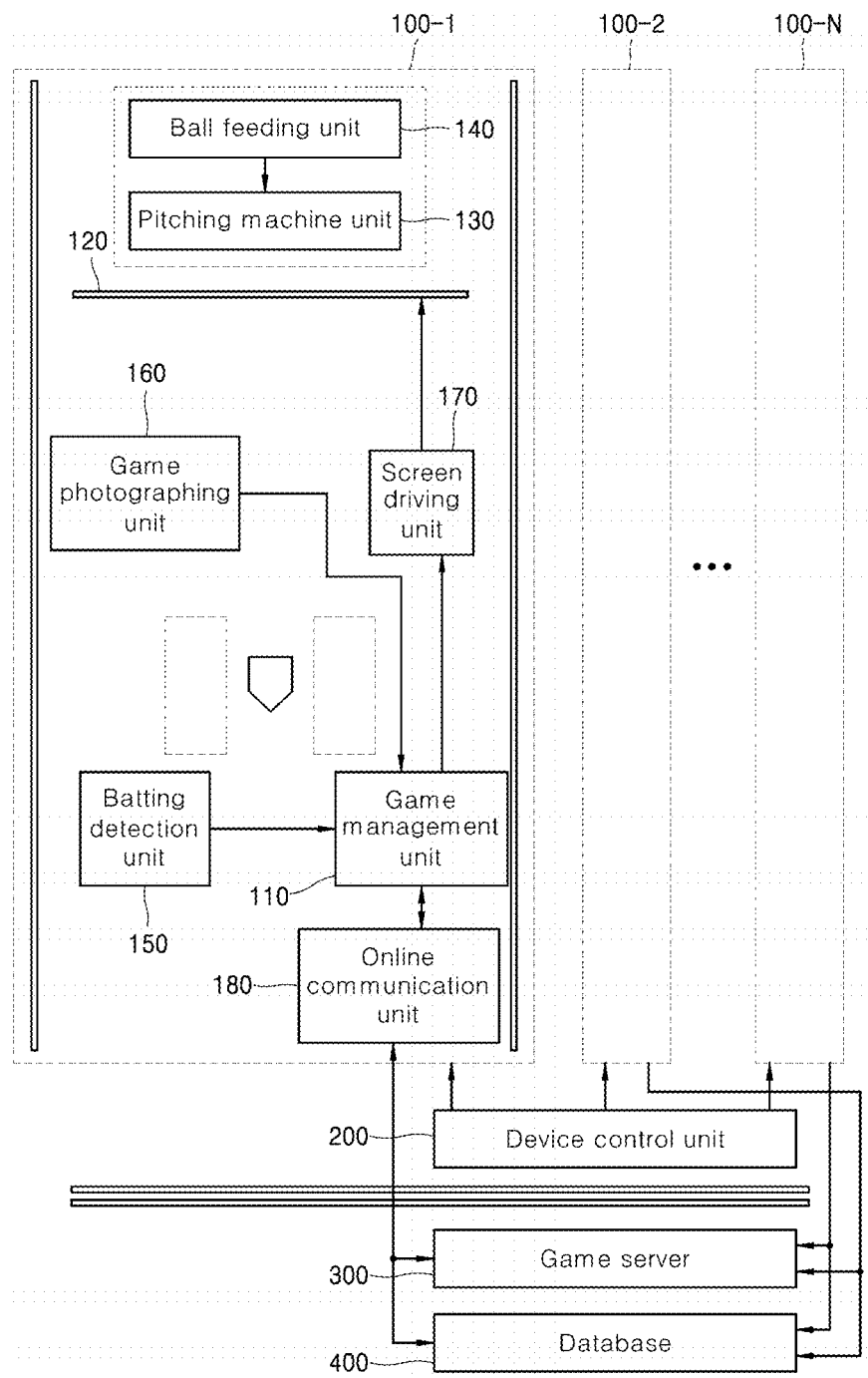
FIG. 1 is a block diagram schematically showing a screen baseball game apparatus without temporal and spatial limitations according to the present invention.

FIG. 1 is a block diagram schematically showing a screen baseball game apparatus without temporal and spatial limitations according to the present invention, and the screen baseball game apparatus includes a plurality of screen baseball devices 100-1 to 100-N, a device control unit 200, a game server 300, and a database 400.

Each of the screen baseball devices 100-1 to 100-N includes a game management unit 110, a screen 120, a pitching machine unit 130, a ball feeding unit 140, a batting detection unit 150, a game photographing unit 160, a screen driving unit 170, and an online communication unit 180.

Hereinafter, the general function of each component of the screen baseball game apparatus without temporal and spatial limitations according to the present invention will be described with reference to FIG. 1. It will be described later detailed operations among the above components.

The game management unit 110 registers a personal rank of a user, performs a simulation along the trajectory of a batted ball, which is obtained by receiving and converting batting detection data, displays a game image on the screen 120 through the screen driving unit 170, and variously adjusts the appearance of a pitcher depending on the distance between the screen 120 and a batter box.

The pitching machine unit 130 receives a ball from the ball feeding unit 140 and automatically or manually pitches the ball based on pitching information on a pitch type selected by a user positioned at a defense side.

The batting detection unit 150 includes plurality of front detection sensors, a plurality of plane position sensors, and a camera sensor to detect coordinate data of a batted ball, a strike ball which fails to be batted, and a foul ball, to remove a shade from (blind areas of) the trajectory of the batted ball, and to detect the change in a movement direction of the batted ball as a batting point.

The game photographing unit 160 photographs the batting image of the user and transmits the batting image of the user to the game management unit 110.

The screen driving unit 170 receives the batting image photographed by the game photographing unit 160 and a simulation image of the game management unit 110 and reproduces the batting image and the simulation image on the screen 120.

The online communication unit 180 transmits simulation information and batting image data displayed on the screen 120 to the game server 300 and the database 400.

The game server 300 matches store systems having available game devices, which are geographically spaced apart from each other, with each other to transmit the simulation information and the batting image data, which are displayed, in real time, so that the game is played online, checks the state of the store systems, and transmits and receives information selected by the user and the control instruction of the manager.

The device control unit 200 is provided in each of a plurality of stores, and issued with a control instruction from the game server 300 to collectively monitor and control the screen baseball devices 100-1 to 100-N so that the screen baseball devices 100-1 to 100-N process the control instruction, and receives state check data from the screen baseball devices 100-1 to 100-N.

The database 400 receives a batting image and game information data from the online communication unit 180 and stores the batting image and the game information data therein so that the batting image and the game information are utilized for a user training program and a character development program.

Hereinafter, the overall operation of the screen baseball game apparatus without temporal and spatial limitations according to the present invention will be described with reference to FIG. 1.

The game management unit 110 registers the personal rank of the user and opens a game.

If a batter is at bat, the game management unit 110 checks the personal rank of the batter based on registered user information.

If a user positioned at a defense side takes a basic defense operation, for example, selects a pitch type, the information on the pitch type is transmitted to the pitching machine unit 130.

If the batter presses a pitching pedal provided in a batter box, a pitching motion is displayed on the screen 120, and a pitching action is started according to the selected pitch type.

If the batter bats a ball, the information on the batting action is transmitted from the batting detecting unit 150 to the game management unit 110, and analyzed as the trajectory of an arch. The game simulation is performed based on the analysis, and the game image is displayed on the screen 120.

In this case, the game photographing unit 160, which is mounted on an upper portion of a left wall or a right wall in front of the batter, photographs the batting action of the batter, and transmits the batting image to the game management unit 110.

The same procedure is applied to a next batter, and the game is continuously played according to a baseball rule.

The procedure of the game is transmitted to the game server 300 and the database 400 through the online communication unit 180.

The database 400 receives the batting image and the game information data from the game management unit 110 and stores the batting image and the game information data therein so that the batting image and the game information are utilized for the user training program and the character development program.

Meanwhile, if an opponent of a game is another user positioned in a remote place, the game server 300 transmits the simulation information and the batting image, which are displayed, to a game store, in which the opponent is positioned, in real time so that the game may be played online.

For example, when a plurality of users want make a team in a store C and play a game together with another team, and a desirable opponent team is located in another store D, the game server 300 displays simulation information and batting image data, which are displayed in the store C, on a monitor or screen of the game management unit 110 in the store D as if both teams play the game in one place.

Hereinafter, the operations of the game management unit, the game server, and the database in the screen baseball game apparatus according to the present invention will be described with reference to FIG. 1.

Operation of Game Management Unit

The game management unit 110 is provided in the form of a personal computer (PC) and located adjacent to the batter box, and includes a keyboard, a mouse, a monitor, or a touch screen.

The game management unit 110 registers a user to be first at bat according teams. In this case, the game management unit 110 registers the user in such a manner that personal rank of the user is applied to the game and reflected on the game.

In order to simplify user registration, additional registration cards (a bar code or an RF card) having the personal rank and the member subscription information of the user may be issued and a relevant reader may be mounted as an input device.

In addition, as the portable terminal is extensively used recently, the personal rank and the member subscription information of the user are input through an application of the portable terminal, and the application is executed through a short-range communication function of the portable terminal so that the personal rank of the user may be registered.

The game management unit 110 allows a defense team to select a pitch type of a ball to be pitched by the pitching machine unit 130.

In this case, to prevent pitching information from leaking to an offense side, an additional input device may be equipped in the form of a keypad.

The additional input device equipped in the form of the keypad includes not only a button set including a small number of buttons, but also game operators such as joy sticks.

Generally, in a baseball game, a defensive position can be dynamically changed according to a batter characteristic, a runner situation, and a score situation. The game management unit 110 allows the selection of the defensive position through the basic input device or the additional keypad.

The offense side changes the motion of a runner (run-and-hit, or hit-and-run) according to the runner situation and the score situation, which serves as an important factor of increasing the game participation of the user. Accordingly, the game management unit 110 may allow the offense side to set the motion of the runner through the basic input device and the additional input device.

The batting data detected by the batting detection unit 150 are changed to the trajectory of the ball, and the game is simulated so that the defending procedure is automatically performed according to the trajectory of the ball and the game situation.

Baseball is called a record game so that each game element is important. Accordingly, the information on a present game becomes important basic information when a next game is played.

Accordingly, the information on the present game is subject to a predetermined process for the storage in the database 400.

In addition, the game management unit 110 periodically checks the states of the screen baseball devices and whether the screen baseball devices operate normally, and stores the check data in the database 400 through the Internet, so that the manager can frequently monitor the screen baseball devices through the game server 300.

In addition, the communication scheme for the process is not limited to a wired scheme, and the process may be performed through an application in a smart phone over a short-range communication network or the Internet.

Operations of Game Server and Database

The game server 300 matches the available game devices among game devices of the stores, which have been completely checked, with each other and remotely transmits instructions or data on the operation intended by the manager to the game devices so that the game devices process the instructions or the data in real time.

The database 400 stores therein data obtained as the game management unit 110 periodically checks the states of the screen baseball devices and whether the screen baseball devices operate normally, so that the manager can frequently monitor the screen baseball devices through the game server 300.

In addition, each store stores available game schedules input in an individual unit or a team unit by the users and provides reference data for the game match by the game server 300.

The game server 300 allows the game record (winning percentage and batting average) of an individual and a relevant team.

In addition, users may play a game not only in one place while facing against each other, but also in mutually different regions by online sharing the information of players and a game simulation in real time between regions geographically spaced apart from each other.

Further, the game server 300 inputs an available game schedule in an individual unit or a team unit, or allows a user to check the available game schedule of another person. Accordingly, the game server 300 controls a game match in such a manner that the user may not only search for a ballpark together with an opponent to play a game, but also easily find an opponent to play a game even if there is no opponent.

Accordingly, the user may play the game together with the opponent in one space, and play an online game together with the opponent in mutually different regions, which allows the user to more conveniently play the game together with the opponent.

Meanwhile, if the superiority or the inferiority of a player is determined based on a physical advantage or a physical disadvantage, the player is avoided as an opponent. Accordingly, in order to overcome this, the game server 300 is provided with a user training program and a character development program to be reflected on the game simulation.

The above function is not provided for a user through a specific input/output device. In other words, only if the user basically accesses the Internet, the above function may be variously provided such as a web browser or an application.

Figure 2A:
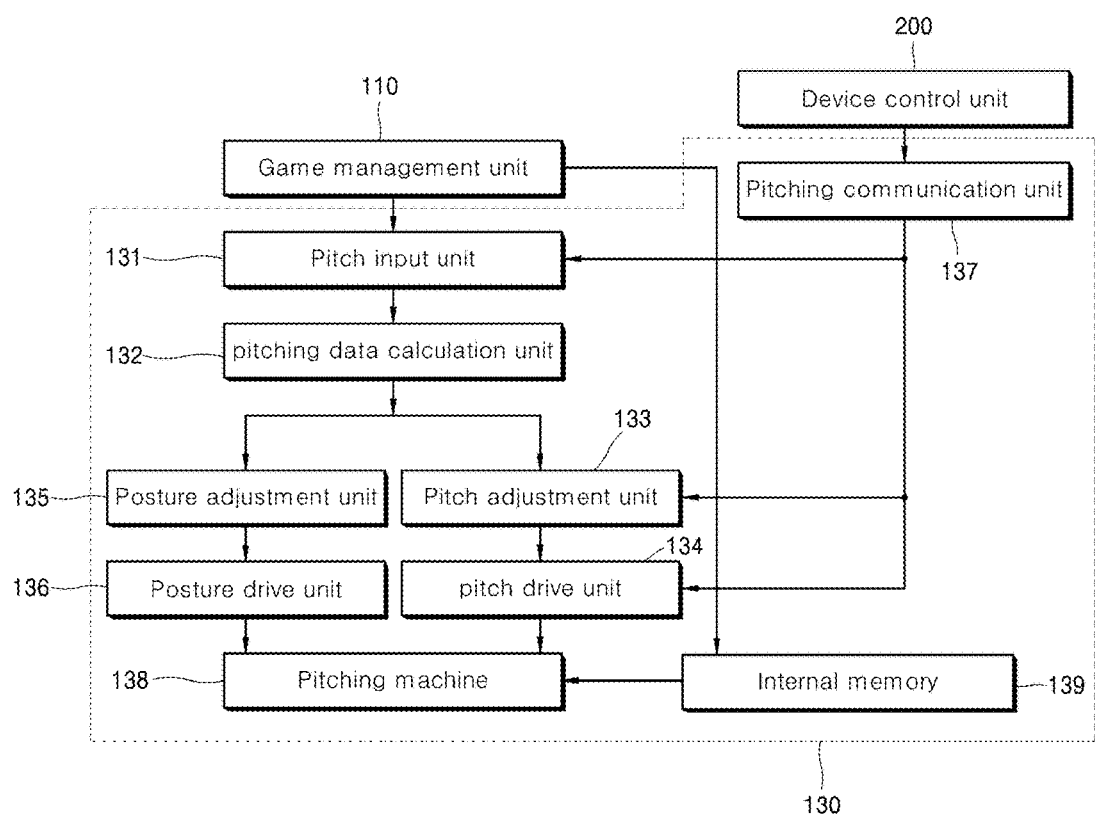
FIGS. 2a and 2b are views to explain the operation of a pitching machine unit in the screen baseball game apparatus shown in FIG. 1.
Figure 2B:
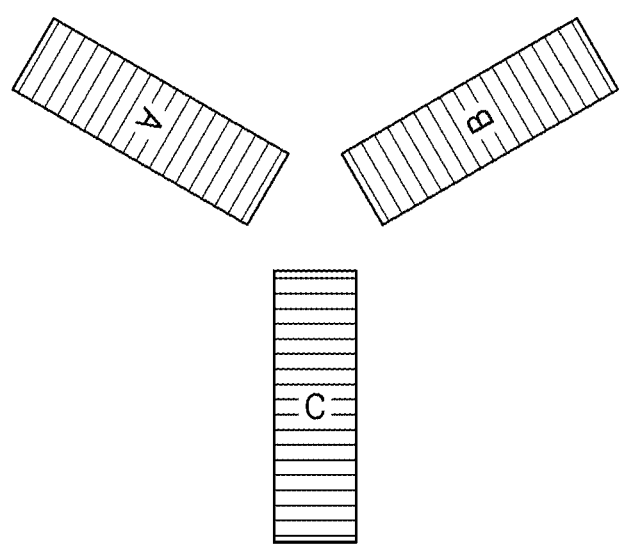

FIGS. 2a and 2b are views to explain the operation of the pitching machine unit 130 in the screen baseball game apparatus shown in FIG. 1. The screen baseball game apparatus includes the game management unit 110, the pitching machine unit 130, and the device control unit 200. The pitching machine unit 130 includes a pitching input unit 131, a pitching data calculation unit 132, a pitch adjustment unit 133, a pitch drive unit 134, a posture adjustment unit 135, a posture drive unit 136, a pitching communication unit 137, a pitching machine 138, and an internal memory 139.

Figure 3:
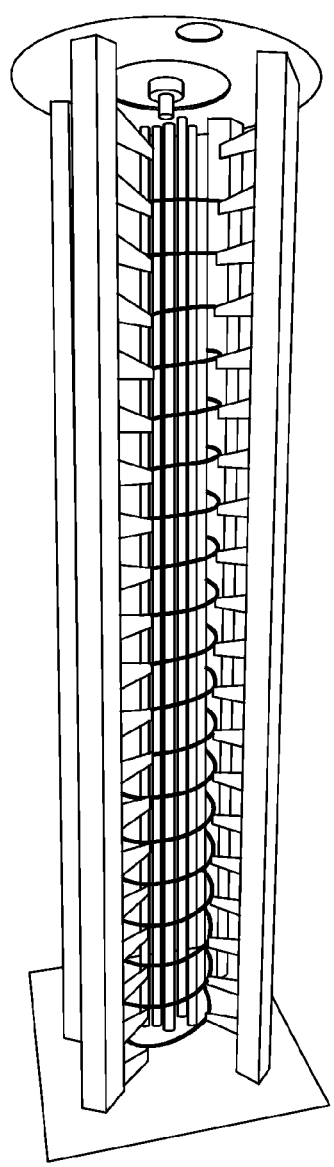
FIG. 3 is a photograph showing a ball feeding unit in the screen baseball game apparatus shown in FIG. 1.

FIG. 3 is a photograph showing the ball feeding unit 140 in the screen baseball game apparatus shown in FIG. 1.

Figure 4:
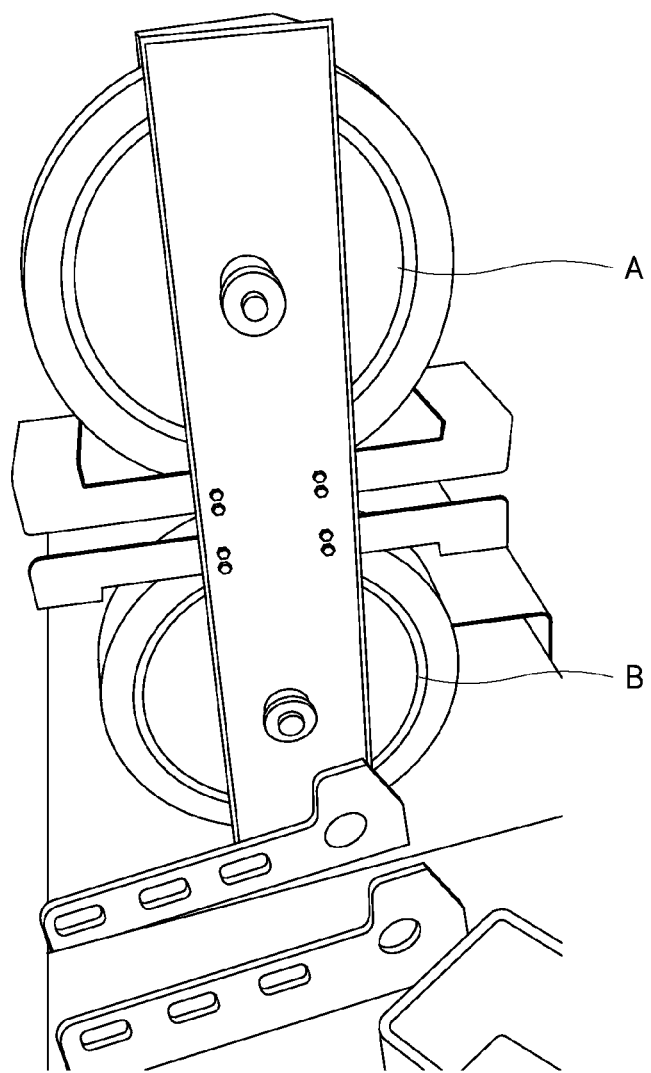
FIG. 4 is a photograph showing pitching machine in the screen baseball game apparatus shown in FIG. 2.

FIG. 4 is a photograph showing the pitching machine 138 in the screen baseball game apparatus shown in FIG. 2.

Hereinafter, the operation of the pitching machine unit in the screen baseball game apparatus according to the present invention will be described with reference to FIGS. 1 to 4.

Operation of Pitching Machine Unit

If the game management unit 110 transmits the personal rank of a user and the pitching information to the pitching machine unit 130, the pitching machine unit 130 receives a ball from the ball feeding unit 140 shown in FIG. 1, adjusts a pitch and the posture of a pitcher according to the selected pitch type, and starts a pitching action.

In other words, as shown in FIG. 2a, the pitching data including the pitch type of a ball to be pitched, which is selected by the defense side 110, the personal rank of a batter positioned in the offense side, and the height of the batter, which are registered in the game photographing unit 160, are transmitted to the pitching input unit 131 through the game management unit over serial communication, a local area network (LAN), or the Internet.

The pitching data calculation unit 132 receives the pitching data from the game management unit 110, generates a pitch value, which is preset or input from the pitching input unit 131, and calculates and outputs data for pitch adjustment and posture adjustment corresponding to a strike zone using the pitch value and the information of the batter.

The pitch adjustment unit 133 receives the data for pitch adjustment from the pitch data calculation unit 132 to control the pitch drive unit 134 so that the pitch is adjusted. Accordingly, the pitching machine 138 performs a pitching action corresponding to the input pitching data.

The posture adjustment unit 135 receives the data for posture adjustment from the pitching data calculation unit 132, controls the posture drive unit 136 to adjust the posture of the pitcher on the screen, and controls the pitching machine 138 to perform the pitching action so that the pitching machine 138 performs the pitching action corresponding to the input pitching data.

The pitching input unit 131, the pitch adjustment unit 133, and the posture adjustment unit 135 include additional input devices such as a keypad or a volume controller. Accordingly, if there is no additional pitching data input signal from the game management unit 110, or the pitching machine 138 is set to be manually adjusted, the pitching machine 138 may indiscriminately pitch balls having a specific pattern.

Regarding the manually adjusting of the pitching machine 138, the device control unit 200 may collectively monitor and control a plurality of pitching machines 138 through the pitching communication unit 137.

As shown in FIG. 4, the pitching machine 138 is provided in the form of two wheels to push a ball as the two wheels A and B are rotated forward. According to the rotational speeds of the two wheels A and B, the pitch type of the ball is determined to a fastball, a forkball, or a slider ball.

In this case, as shown in FIG. 2b, the pitching machine 138 having at least three wheels may be provided so that the pitch type of the ball may be determined to a curveball or changeup according to the rotational speeds of the three wheels.

In other words, if the three wheels A, B, and C have the same rotational speeds, a ball is pitched in the form of a fastball. In this case, the speed of the ball is determined in proportion to the revolutions of the wheels A, B, and C.

If the rotation of the wheel C is adjusted in the state that the rotational speeds of the wheels A and B are equal to each other, the ball is pitched in the form of a forkball, in which the drop of the ball is sharpened or dulled.

Similarly, if the revolution of each of the wheels A and B is adjusted in the state that each of the rotational speeds of the wheels A and B is equal to that of the wheel C, the ball is pitched in the form of a curveball that is curved left or right.

In an actual operation in a store, the revolutions of the wheels A, B, and C are varied depending on the distance between the pitching machine 138 and the batter box. Accordingly, it is significantly difficult to individually adjust the revolutions every time according to pitch types. Therefore, preferably, the pitching machine unit 130 previously stores an adjustment value for a specific pitch type in an internal memory 139 (for example, EPROM, or RAM), and uses the adjustment value.

FIGS. 5a to 5d are views to explain the operation of the batting detection unit 150 in the screen baseball game apparatus shown in FIG. 1, and the batting detection unit 150 includes a front detection sensor 151, a plane position sensor 152, and a camera sensor 153.

Figure 6:
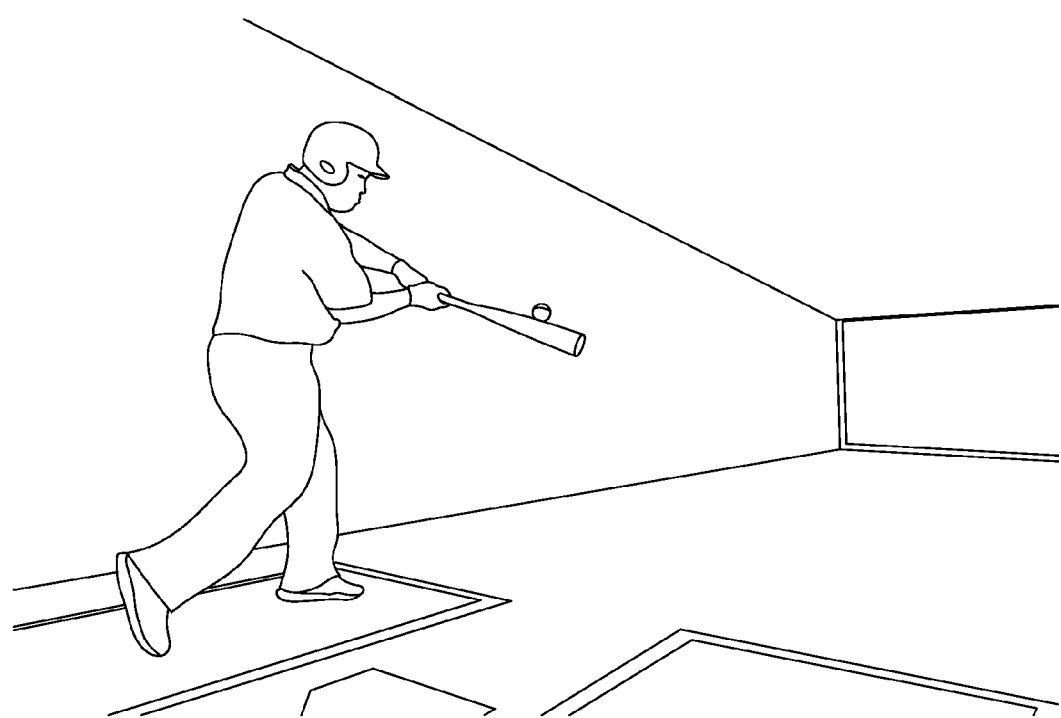
FIG. 6 is a photograph showing an actual batting appearance of a user using the screen baseball game apparatus shown in FIG. 1.

FIG. 6 is a photograph showing an actual batting appearance of the user using the screen baseball game apparatus shown in FIG. 1.

Figure 7:
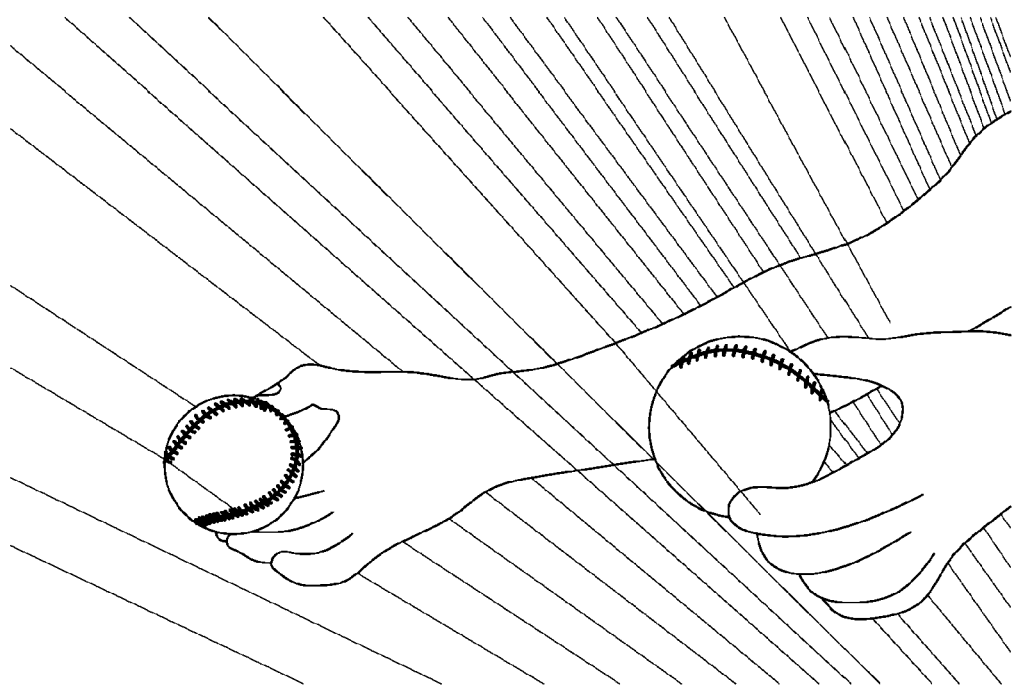
FIG. 7 is a photograph showing that a plurality of front detection sensors provided in the screen baseball game apparatus shown in FIG. 5 detect a batted ball.

FIG. 7 is a photograph showing that a plurality of front detection sensors provided in the screen baseball game apparatus shown in FIG. 5 detect a batted ball.

Hereinafter, the operation of the batting detection unit in the screen baseball game apparatus according to the present invention will be described with reference to FIGS. 1 to 7.

Operation of Batting Detection Unit

Figure 5A:
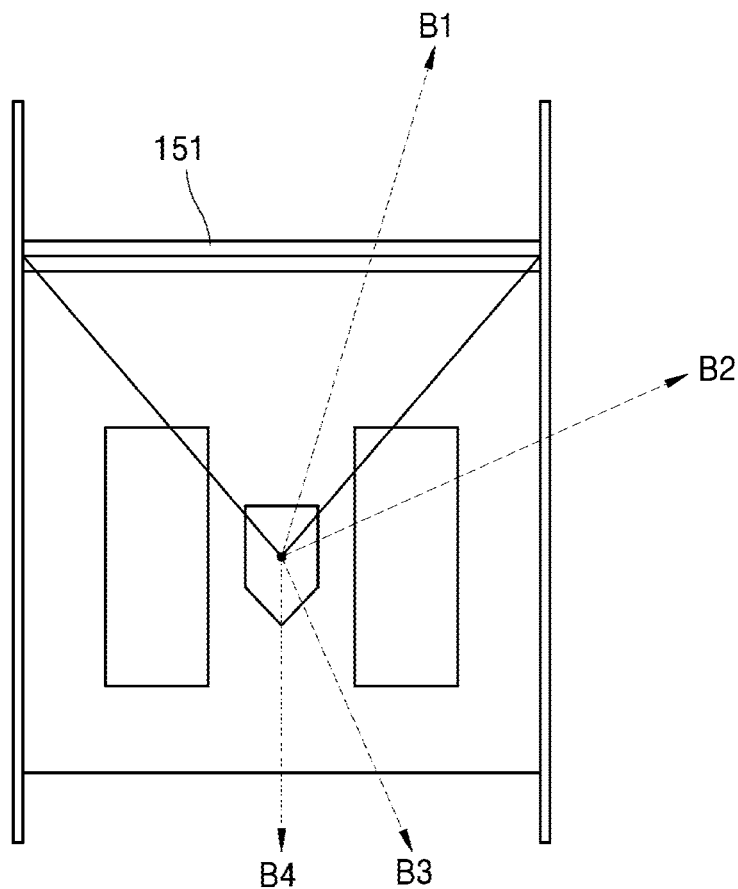
FIGS. 5a to 5d are views to explain the operation of a batting detection unit in the screen baseball game apparatus shown in FIG. 1.

As shown in FIG. 5a, although the front detection sensor 151 may detect horizontal and vertical coordinate data of the batted ball to detect the trajectory of the batted ball, the front detection sensor 151 may detect only the trajectory B1 of the batted ball according to the mounting position of the front detection sensor 151, and may not detect trajectories B2, B3, and B4 of the batted ball, which may generate shadow regions.

Accordingly, it may be difficult to distinguish between the strike ball, which fails to be batted, and a batted ball (foul ball) which does not pass through the front detection sensor 151, so that the reality may be degraded in playing a game.

Figure 5B:
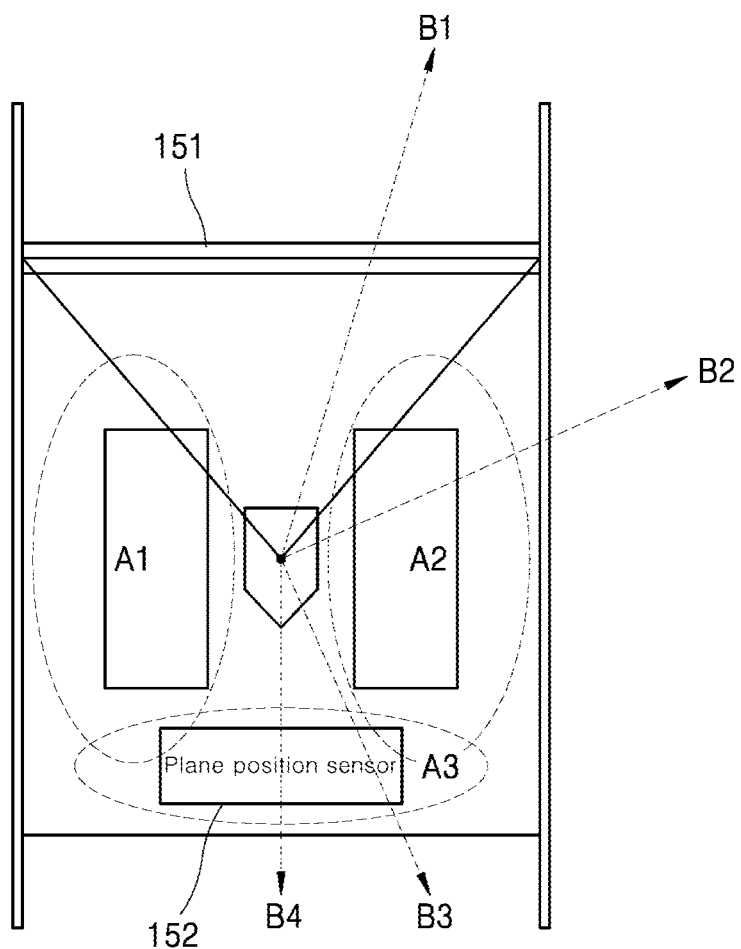

In order to overcome this problem, according to the present invention, as shown in FIG. 5b, additional plane position sensors 152 (for example, ultrasonic sensor) are placed at left and right batter boxes A1 and A2 and a catcher area A3 to detect the trajectories of the batted ball B2, B3, and B4.

Figure 5C:
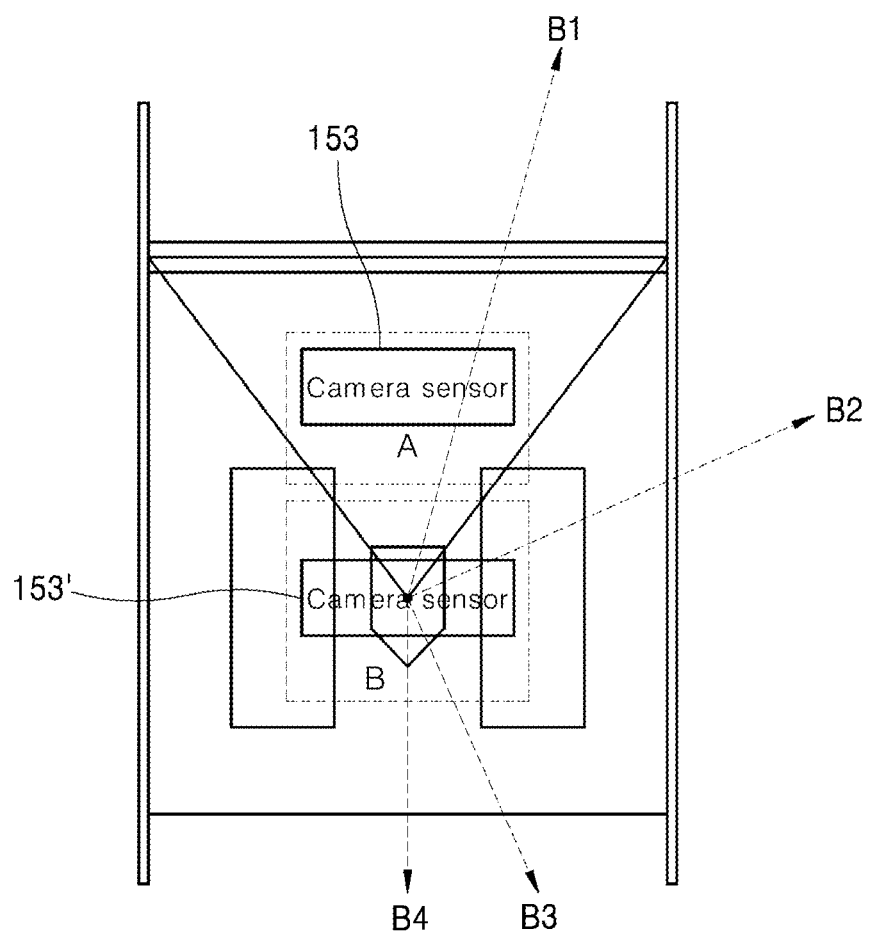

As shown in FIG. 5c, a camera sensor 153 is generally positioned at a location A slightly spaced apart from the batting point. However, shadow parts of the trajectories B2, B3, and B4 of the batted ball, which are not detected by the camera sensor 153, are caused.

In order to remove the shadow parts, according to the present invention, as shown in FIG. 5c, the position of the camera sensor 153 is set to a position B of a home plate where the batting point may be observed, thereby removing the shadow parts from the trajectories B2, B3, and B4 of the batted ball and detecting the change of the movement direction of the ball at the batting point, so that a rear foul tip can be distinguished.

In general, the use of the camera sensor 153 exponentially increases cost in proportion to the sensing power thereof. According to the present invention, the front detection sensor 151 is in charge of precisely determining the trajectory of the batted ball, and the camera sensor 153 removes the shadow part from the trajectory of the batted ball. Accordingly, the use of the high-priced camera sensor is minimized.

Figure 5D:
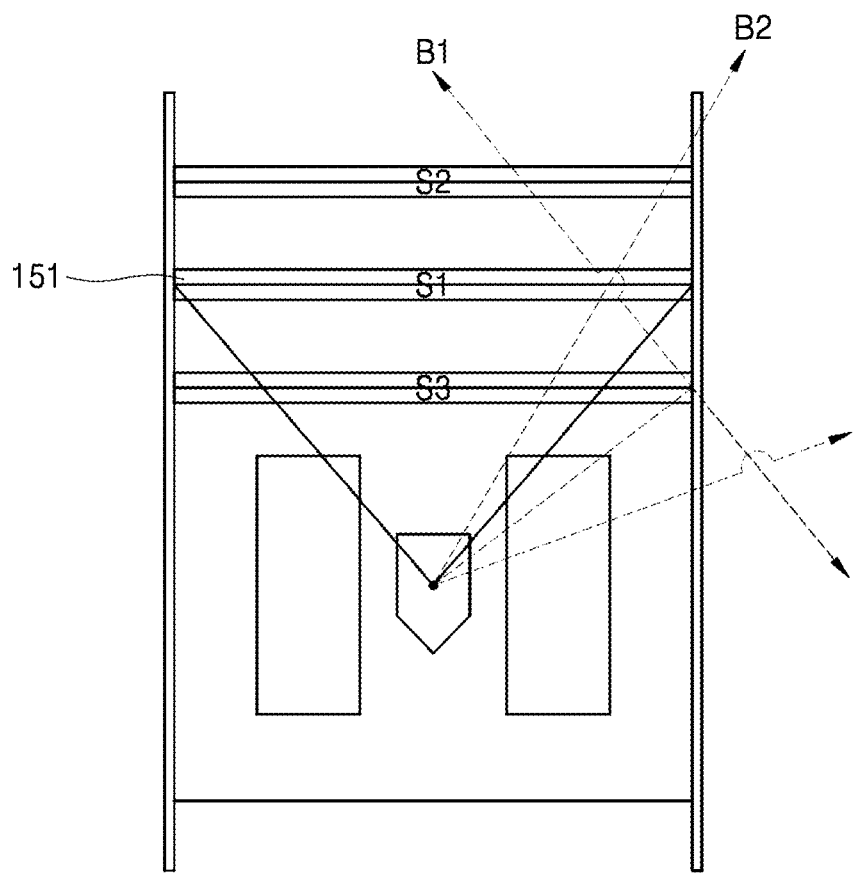

As shown in FIG. 5d, the front detection sensor 151 is basically mounted at a position S1 so that both wall surfaces of the ballpark make contact with an extension line of a base, or may be mounted at a rear position S2 or a front position S3 of the position S1 according to the installation conditions of the present system.

In other words, as the front detection sensor 151 is closer to the batter box (S3), the probability that the bat passes through the sensor may be increased. On the other hand, as the front detection sensor 151 is gradually away from the batter box (S2), probability is gradually increased that the trajectory B5 of the foul ball bounced from the wall is measured as being identical to the trajectory B6 of the hit ball in terms of a sensor value.

In order to overcome the above limitation, the batting detection unit 150 according to the present invention removes error data occurring in bat recognition by placing the plane position sensor 152 and adjusting the position of the camera sensor 153, and distinguishes between the trajectory B5 of the foul ball bounced from a wall, a floor, or a ceil and the trajectory B6 of the hit ball.

The whole trajectory of the batted ball is read-out through the combination of all data detected by the front detection sensor 151, the plane position sensor 152, and the camera sensor 153.

Figure 8A:
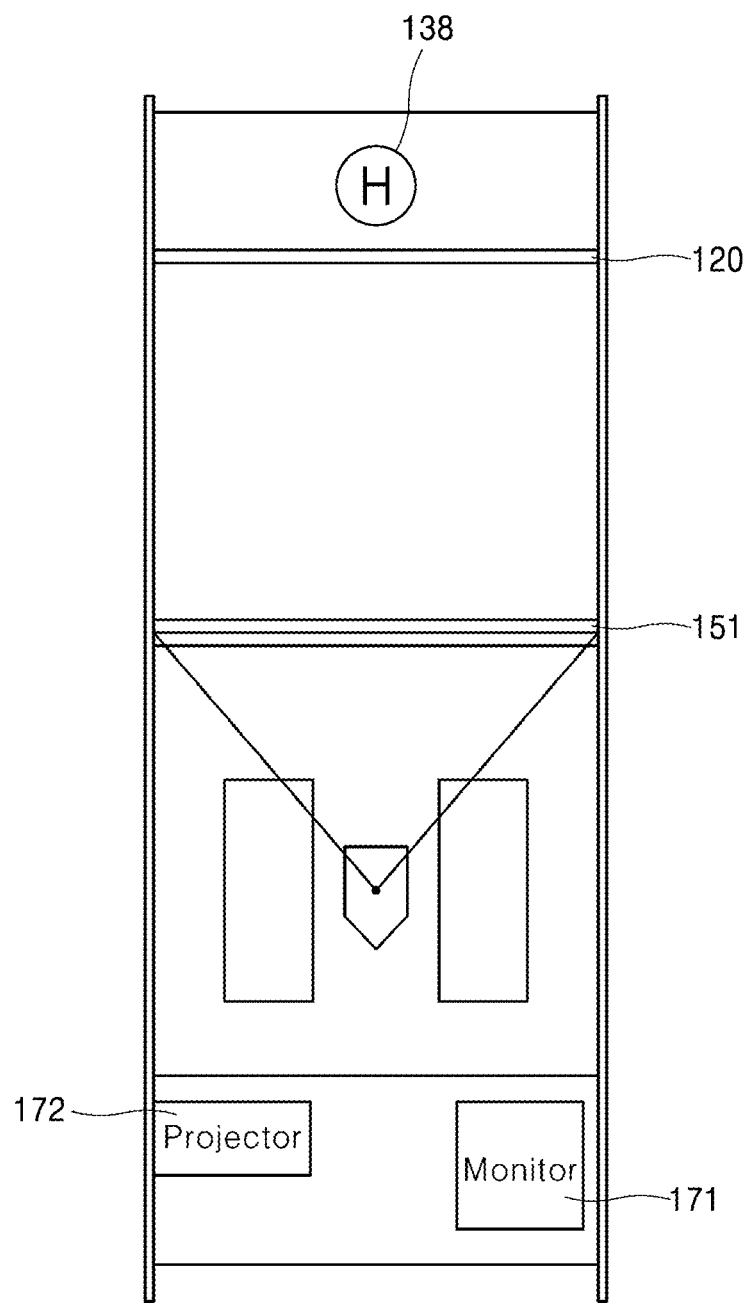
FIGS. 8a to 8c are views to explain the operation of a screen driving unit in the screen baseball game apparatus shown in FIG. 1.
Figure 8B:
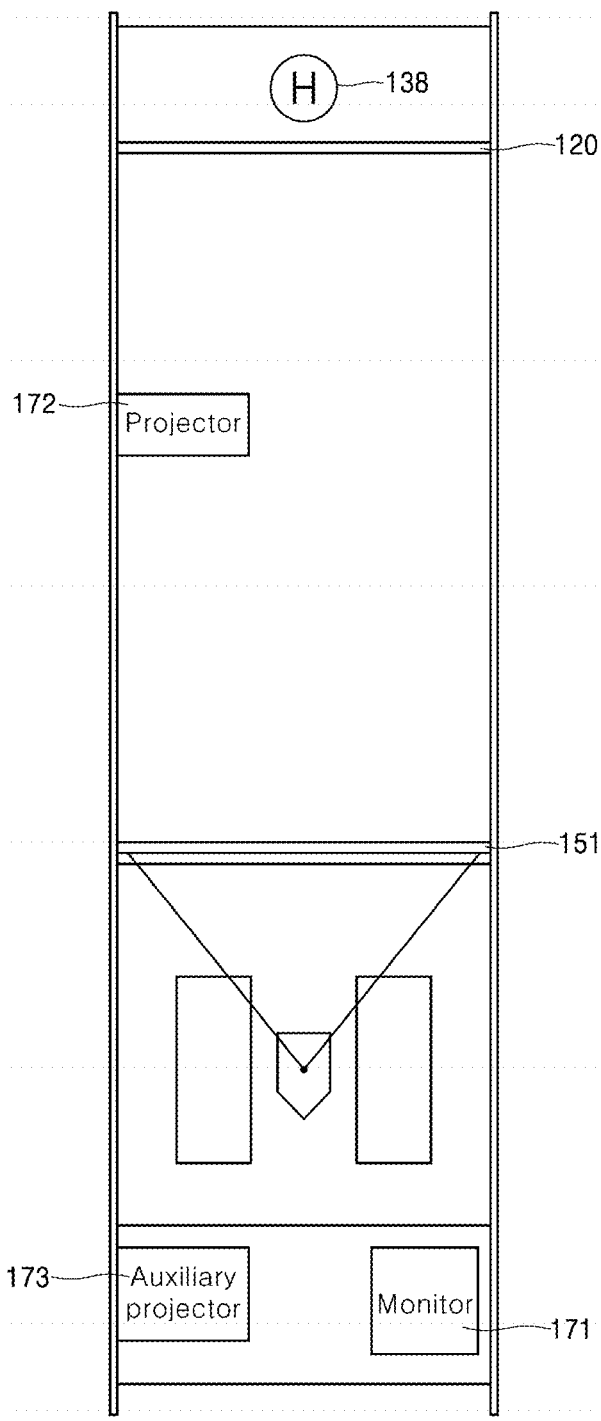
Figure 8C:
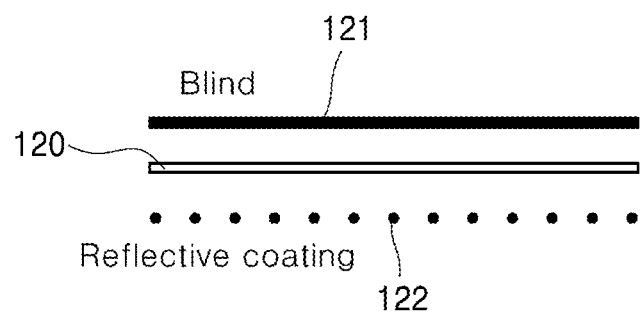

FIGS. 8a to 8c show views to explain the operation of the screen driving unit 170 in the screen baseball game apparatus shown in FIG. 1. The screen driving unit 170 includes the screen 120, a monitor 171, a projector 172, and an auxiliary projector 173.

Figure 9:
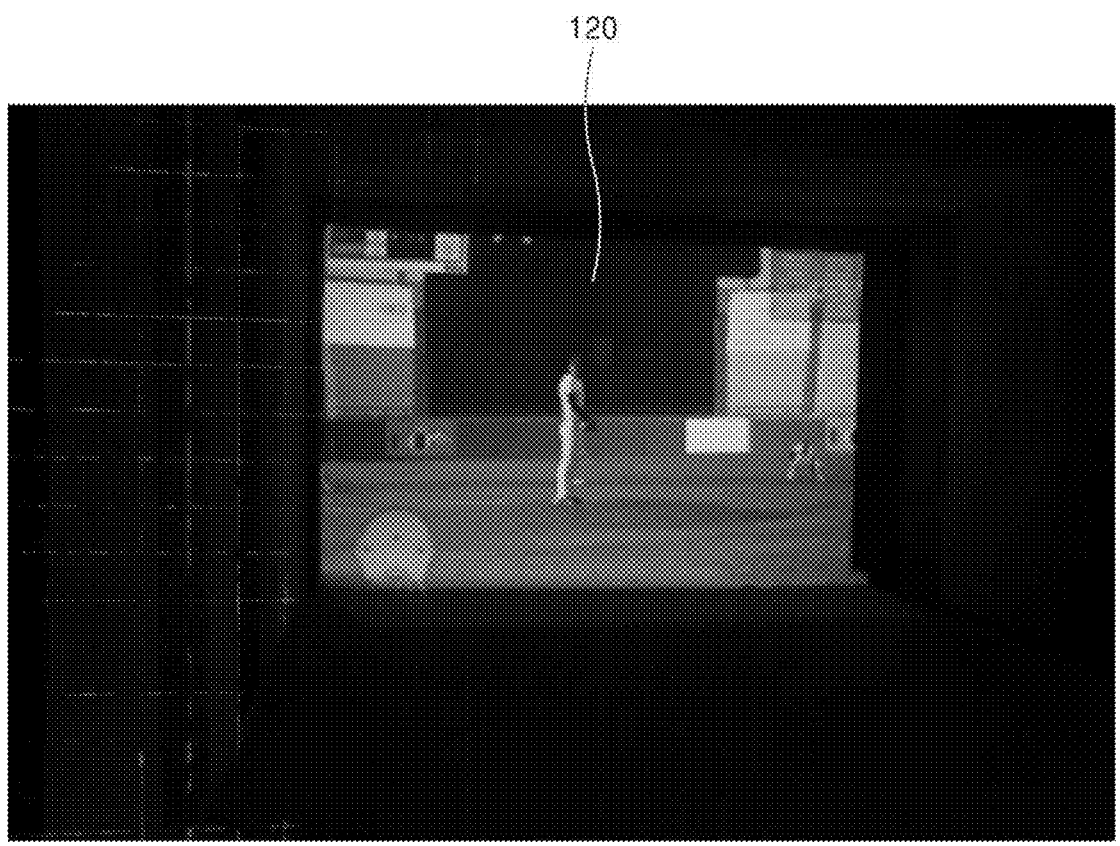
FIG. 9 is a photograph showing an image displayed on a screen in the screen baseball game apparatus shown in FIG. 1.

FIG. 9 is a photograph showing an image displayed on the screen 120 in the screen baseball game apparatus shown in FIG. 1.

Hereinafter, the operation of the screen driving unit in the screen baseball game apparatus according to the present invention will be described with reference to FIGS. 1 to 9.

Operation of Screen Driving Unit

As shown in FIG. 8a, the screen 120 is positioned in front of the pitching machine 138. If the monitor 171 is commonly used as a management monitor of the game management unit 110, the position of the monitor 171 may be limited. Accordingly, the monitor 171 is additionally mounted in a batter waiting room.

The projector 172 is positioned at a rear of the batter boxy or at a proper distance (for example, 8 m) from the front of the screen 120 depending on the distance between the pitching machine 138 and the batter box.

The screen 120 and the monitor 171 may display the same contents, or may display mutually different contents with mutually different functions. In detail, the screen 120 may display images similar to those of an actually broadcasted baseball game through the projector 172, and the monitor 171 intensively displays the information (for example, information of a batter and the information of batting) required for playing the game, so that users can be totally involved into the game.

As shown in FIG. 8b, when the pitching machine 138 is away from the batter box, even the distance between the pitch machine 138 and the screen 120 is increased, so that the viewing angle of the batter may be narrowed.

In order to overcome this, according to the present invention, the auxiliary projector 173 is additionally mounted, so that surrounding images, which are not viewed on the screen 120, are displayed on a wall surface instead of the screen 120, so that the viewing angle of the batter is widened.

In this case, as the surrounding images are displayed on the wall surface, image distortion may be caused according to a projection distance. Accordingly, the game management unit 110 corrects image distortion through a predetermined image distortion correcting software.

If a pitcher having the same appearance makes a pitching motion in pitching regardless of the distance between the screen 120 and the batter box, the batter may not feel reality resulting from a real distance. Accordingly, the game management unit 110 freely adjusts the appearance of the pitcher so that the pitching motion is viewed with reality according to the distance between the screen 120 and the batter box.

As shown in FIG. 8c, the screen 120 generally employs white fabric. However, if brighter light exists on the rear surface of the screen 120, the image may not be clearly viewed.

In order to overcome this problem, according to the present invention, the light irradiated onto the rear surface of the screen 120 is shielded with a blind 121, and a reflective material is additionally coated on a front surface of the screen 120 in order to form a brighter screen.

Figure 10A:
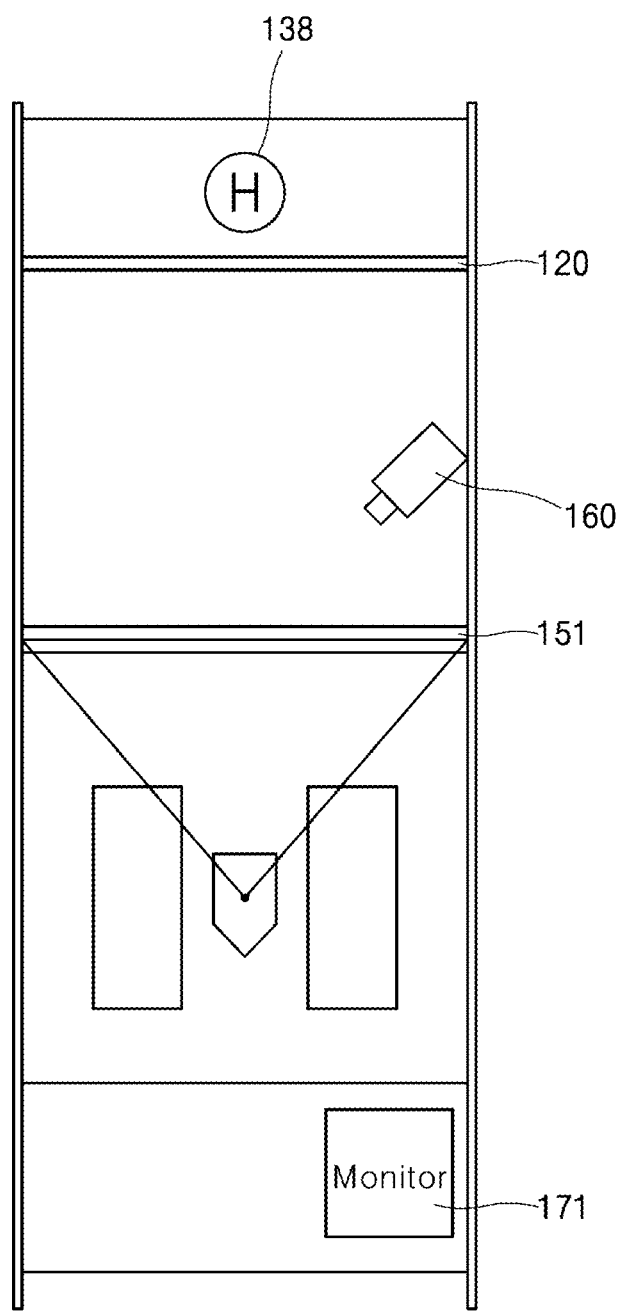
FIGS. 10a and 10b are views to explain the operation of a game photographing unit in the screen baseball game apparatus shown in FIG. 1.
Figure 10B:
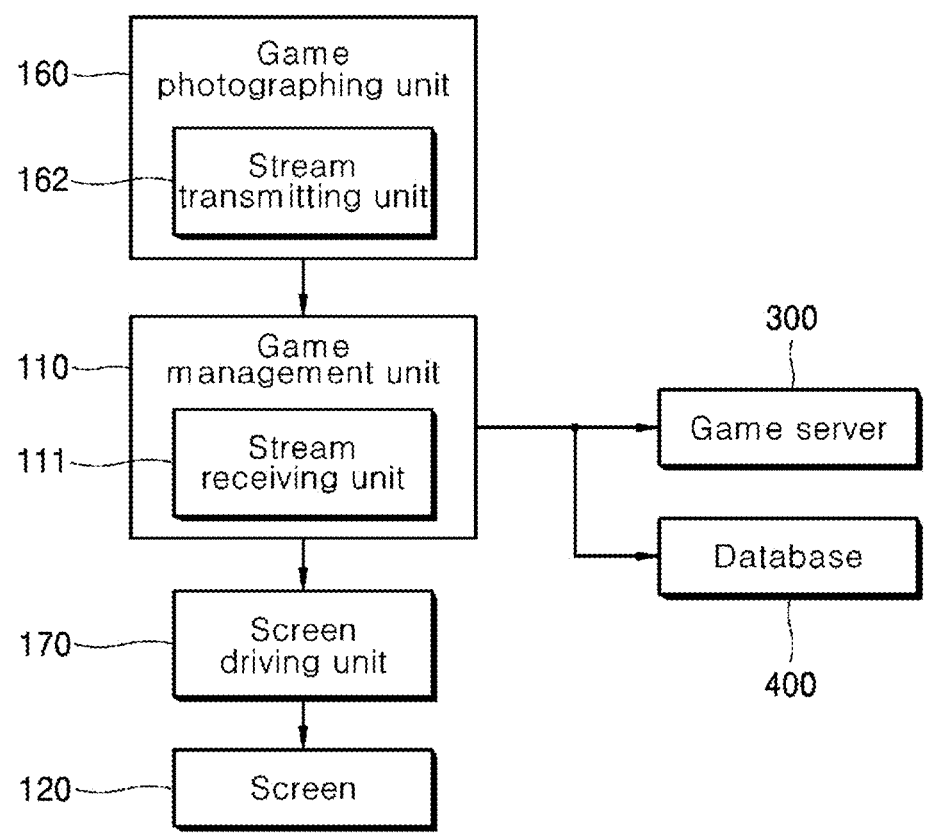

FIGS. 10a and 10b are views to explain the operation of a game photographing unit 160 in the screen baseball game apparatus shown in FIG. 1. FIGS. 10a and 10b include a game photographing unit 160, a game management unit 110, a screen 120, a screen driving unit 170, a game server 300, and a database 400.

Hereinafter, the operation of the game photographing unit 160 in the screen baseball game apparatus according to the present invention will be described with reference to FIGS. 1 to 10.

Operation of Game Photographing Unit

As shown in FIG. 10a, the game photographing unit 160 is mounted on the upper portion of the left wall or the right wall in front of the batter to photograph a batting image of the batter.

As shown in FIG. 10b, the game photographing unit 160 is embedded therein with a stream transmitting unit 162 to transmit the photographed batting image to the game management unit 110.

The game management unit 110 transmits the photographed batting image, which is received from the stream transmitting unit 162, to the screen driving unit 170 through a stream receiving unit 111 embedded in the game management unit 110 and reproduces the photographed batting image on the screen 120.

In addition, a specific image material (for example, a good-quality hitting image) among the photographed batting images is temporarily stored, and transmitted to and stored in the database 400, so that the specific image material may be utilized for the user training program and the character development program thereafter.

For example, a user who wants to check a batting posture of the user to more improve a game capability may refer to the specific image material, such as the hitting image, online through various schemes, and may refer to the specific image material by displaying the specific image material on the screen.

In addition, the user may easily check advantages and disadvantages of the batting posture of the user by using the ball distribution obtained from the batting image and the game information.

Further, a user who wants a personal lesson to correct or complement the batting posture of the user is directly connected with an ex-player or a current player through the introduction of a store in order to receive an offline personal lesson from the ex-payer or the current player.

As described above, in the screen baseball game apparatus without temporal and spatial limitations according to the present invention, an ordinary person can easily select a pitch type of a ball to be pitched or various game conditions to freely enjoy baseball without a limitation such as the difference in level between users.

Further, factors of determining "strike" or "ball", options in various offensive and defensive actions, or a point calculating scheme can be variously adjusted beyond a game depending on batting. In addition, a ball is actually movable along a predetermined trajectory according to pitching or batting in a virtual baseball field, so that the reality and interesting can be improved.

In addition, users may play a game even in mutually different regions by sharing the information of players and a game simulation in real time online between regions geographically spaced apart from each other. Accordingly, the users can enjoy baseball without temporal and spatial limitations. The batting posture of the user is corrected through the character development program based on the batting images in the game and the game information, so that the user may improve a game capability.

In addition, the game server receives the periodic state check data and the live game simulation data of the screen baseball devices installed in a plurality of store systems, and transmits a necessary instruction or data so that the screen baseball devices process an operation intended by a manager. Accordingly, the game server located in a remote place can monitor the screen baseball devices installed in the plurality of store systems to perform management including state check, function adjustment, and maintenance of the screen baseball devices.

Although exemplary embodiments of the present invention have been described for illustrative purposes, the present invention is not limited thereto. In addition, those skilled in the art to which the present invention pertains will appreciate that various equivalents, modifications, additions and substitutions are possible, without departing from the scope and spirit of the invention as disclosed in the accompanying claims.

What is claimed is:

1. A screen baseball game apparatus without temporal and spatial limitations, the screen baseball game apparatus comprising:
   a pitching machine unit that pitches a ball according to a pitch type based on pitching information selected by a defense side;
   a batting detection unit that, as the pitching is started when a batter in an offense side presses a pitching pedal, detects batting of the batter and outputs batting detection data;
   a game management unit that registers a personal bank of a user, periodically checks states of screen baseball devices and whether the screen baseball devices operate normally, receives the batting detection data, converts the batting detection data into a trajectory of a batted ball, performs a simulation along the trajectory of the batted ball, and outputs simulation information;

a game photographing unit that photographs batting of the batter and transmits a batting image to the game management unit;

a screen that displays a pitching motion, the simulation information, and the batting image;

a screen driving unit that receives the batting image and the simulation information and reproduces the batting image and the simulation information on the screen;

a game server that matches stores, which have available game devices among a plurality of stores, with each other, checks states of the screen baseball devices provided in the plurality of stores, and transmits and receives information selected by the user and a control instruction of a manger through the game management unit;

a database that stores periodic check data of the game management unit, stores an available game schedule input through the game management unit in each store to provide the available game schedule to the game server, and stores the batting image and game information data to be utilized for a user training program and a character development program; and a device control unit that receives the control instruction from the game server to collectively monitor and control the screen baseball devices such that the screen baseball devices process the control instruction, wherein the batting detection unit comprises:

a plurality of front detection sensors provided in a contact position between both wall surfaces of a ballpark and an extension line of a base, and a front position or a rear position of the contact position to detect coordinate data of the batted ball;

a plurality of plane position sensors provided in left and right batter boxes and a catcher area to detect a strike ball which fails to be batted and a foul ball; and a camera sensor provided in a home plate to remove shade from blind areas the trajectory of the batted ball and to detect change in a movement direction of the batted ball at a batting point.

2. The screen baseball game apparatus of claim 1, wherein the screen baseball device comprises an online communication unit that receives the simulation information and batting image data and transmits the simulation information and the batting image data to the game server and the database.

3. The screen baseball game apparatus of claim 1, wherein the game management unit issues a registration card having the personal rank and member subscription information of the user; and registers the personal rank through a reader to read the registration card.

4. The screen baseball game apparatus of claim 1, wherein the game management unit inputs the personal rank and member subscription information of the user using an application of a portable terminal, and registers the personal rank by interworking with the application through a short-range communication function of the portable terminal.

5. The screen baseball game apparatus of claim 1, wherein the pitch type of the ball to be pitched is selected through a keypad or a joystick to prevent the pitching information from leaking to the offense side.

6. The screen baseball game apparatus of claim 1, wherein the pitching machine unit comprises:

a pitching input unit that receives pitching data, which includes the pitch type selected by the defense side, and batting information on both the personal rank and a height of the batter in the offense side, through the game management unit;

a pitching data calculation unit that receives the pitching data, generates a pitch value, which is preset, or a pitch value of the pitch type directly input from the pitching input unit, and calculates and outputs data for pitch adjustment and posture adjustment corresponding to a strike zone using the pitch value and the batting information;

a pitch adjustment unit that receives the data for pitch adjustment to control a pitch drive unit such that the pitch type of the ball to be pitched is adjusted;

a posture adjustment unit that receives the data for posture adjustment to control a posture drive unit such that a posture of a pitcher on the screen is adjusted; and a pitching machine that receives the ball from a ball feeding unit and pitches the ball according to the pitch type and the posture of the pitcher that are adjusted.

7. The screen baseball game apparatus of claim 6, wherein the pitching machine comprises a plurality of wheels that push the ball by rotating forward, and the pitch type of the ball is determined depending on rotational speeds of the plurality of wheels.

8. The screen baseball game apparatus of claim 6, wherein the pitching machine unit further comprises an internal memory that previously stores an adjustment value for a specific pitch type of the ball to be pitched by taking into consideration that the pitching machine has a different revolution and a distance between the pitching machine and the batter boxes is varied according to the stores.

9. The screen baseball game apparatus of claim 1, wherein, in the game management unit, a defensive position is manually adjusted according to at least one of a batter characteristic, a runner situation, and a score situation by the defense side, and a runner motion is manually adjusted according to at least one of the runner situation and the score situation by the offense side.

10. The screen baseball game apparatus of claim 1, wherein the screen driving unit comprises:

a projector that displays a broadcasted baseball image to show a motion of a player on the screen; and an auxiliary projector that displays a surrounding image, which is not viewed on the screen, on a wall surface.

11. The screen baseball game apparatus of claim 1, wherein the screen comprises:

a blind installed on a rear surface of the screen to shield rear light to increase clarity of a pitching motion image and a simulation image that are displayed; and a reflective coating provided on a front surface of the screen to increase brightness of the pitching motion image and the simulation image that are displayed.

12. The screen baseball game apparatus of claim 1, wherein the game photographing unit comprises a camera mounted on an upper portion of a left wall or a right wall in front of the batter to photograph the batting of the batter and to transmit the batting image of the batter through a stream transmitting unit embedded in the camera, and wherein the game management unit receives the batting image through a stream receiving unit embedded therein, transmits the batting image to the screen driving unit, and reproduces the batting image on the screen.

13. The screen baseball game apparatus of claim 12, wherein the game management unit temporarily stores the batting image, transmits the batting image to the database through the stream receiving unit if necessary, and utilizes the batting image for the user training program and the character development program.

14. The screen baseball game apparatus of claim 2, wherein the online communication unit employs one of wired communication, short-range communication and Internet networks.

* * * * *